US012807821B2

(12) United States Patent
Tamaoka et al.

(10) Patent No.: US 12,807,821 B2
(45) Date of Patent: Nov. 24, 2026

(54) POWDERY MATERIAL FOR 3D PRINTER, THREE-DIMENSIONAL SHAPED OBJECT, AND PRODUCTION METHOD THEREFOR

(71) Applicant: Polyplastics Co., Ltd., Tokyo (JP)

(72) Inventors: Akihiro Tamaoka, Fuji (JP); Yoshiaki Taguchi, Fuji (JP); Yasuyuki Fukute, Fuji (JP)

(73) Assignee: DAICEL CORPORATION, Osaka (JP)

( * ) Notice: Subject to any disclaimer, the term of this patent is extended or adjusted under 35 U.S.C. 154(b) by 70 days.

(21) Appl. No.: 18/710,824

(22) PCT Filed: Nov. 8, 2022

(86) PCT No.: PCT/JP2022/041475

§ 371 (c)(1),
(2) Date: May 16, 2024

(87) PCT Pub. No.: WO2023/090195

PCT Pub. Date: May 25, 2023

(65) Prior Publication Data

US 2025/0019549 A1 Jan. 16, 2025

(30) Foreign Application Priority Data

Nov. 19, 2021 (JP) ................................ 2021-188547

(51) Int. Cl.

| | |
|---|---|
| ***C09D 5/03*** | (2006.01) |
| ***B29C 64/153*** | (2017.01) |
| ***B33Y 10/00*** | (2015.01) |
| ***B33Y 70/00*** | (2020.01) |
| ***C08G 65/16*** | (2006.01) |
| ***C09D 159/04*** | (2006.01) |
| *B29K 59/00* | (2006.01) |
| *B29K 71/00* | (2006.01) |
| *B29K 105/00* | (2006.01) |
| *B29K 509/02* | (2006.01) |

(52) U.S. Cl.

CPC ............ *C09D 5/031* (2013.01); *B29C 64/153* (2017.08); *B33Y 10/00* (2014.12); *B33Y 70/00* (2014.12); *C08G 65/16* (2013.01); *C09D 5/032* (2013.01); *C09D 159/04* (2013.01); *B29K 2059/00* (2013.01); *B29K 2071/02* (2013.01); *B29K 2105/0085* (2013.01); *B29K 2105/0094* (2013.01); *B29K 2509/02* (2013.01); *B29K 2995/0012* (2013.01); *B29K 2995/0082* (2013.01); *B29K 2995/0094* (2013.01)

(58) Field of Classification Search

CPC ......... C09D 5/031; B33Y 70/00; C08G 65/16
See application file for complete search history.

(56) References Cited

U.S. PATENT DOCUMENTS

| | | | | |
|---|---|---|---|---|
| 2012/0208011 | A1* | 8/2012 | Dallner | B33Y 70/00 428/338 |
| 2021/0179846 | A1* | 6/2021 | Peterson | C08J 3/124 |

FOREIGN PATENT DOCUMENTS

| | | | |
|---|---|---|---|
| JP | 2013-508199 | A | 3/2013 |
| JP | 2020-2247 | A | 1/2020 |
| JP | 2020-193277 | A | 12/2020 |
| WO | 2021/127106 | A1 | 6/2021 |

OTHER PUBLICATIONS

International Search Report dated Dec. 27, 2022, issued in counterpart International Application No. PCT/JP2022/041475. (2 pages).
Extended (Supplementary) European Search Report dated Feb. 18, 2025, issued in coutnerpart EP Application No. 22895477.2. (9 pages).

* cited by examiner

*Primary Examiner* — Larry W Thrower
(74) *Attorney, Agent, or Firm* — WHDA, LLP

(57) ABSTRACT

The present invention provides a powdery material for a 3D printer from which a high-density and high-strength three-dimensional shaped object having an excellent appearance can be fabricated, a three-dimensional shaped object obtained by using the same, and a production method therefor. The powdery material (X) for a 3D printer is a powdery material (X) comprising a polyacetal copolymer resin powder (I), wherein a percentage occupied by comonomer units among all constituent units (100 mass %) in the polyacetal copolymer resin is at least 1.0 mass % and at most 6.0 mass %, an average particle diameter of the powder (I) is at least 30 μm and at most 70 μm, and a melt flow rate of the powder (I) measured at a temperature of 190° C. and with a load of 2.16 kg is at least 1.0 g/10 min and at most 8.0 g/10 min.

15 Claims, No Drawings

POWDERY MATERIAL FOR 3D PRINTER, THREE-DIMENSIONAL SHAPED OBJECT, AND PRODUCTION METHOD THEREFOR

TECHNICAL FIELD

The present invention relates to a powdery material for a 3D printer, a three-dimensional shaped object, and a production method therefor.

BACKGROUND 3D printers have been rapidly spreading in recent years because they are able to produce three-dimensional shaped objects without using molds or large-scale melting apparatuses. As shaping methods for 3D printers, fused deposition modeling (FDM), stereolithography (STL), selective laser sintering (SLS), etc. are known. Selective laser sintering is a method in which a process of using a powdery material to form a thin layer and then irradiating the thin layer with a high-power laser beam or with an electron beam to sinter the thin layer is repeated, thereby successively stacking sintered layers to shape objects. This method is more suitable for precision shaping than other shaping methods are.

As powdery materials that can be used in a selective laser sintering 3D printer, polyamide-11, polyamide-12, polypropylene, etc. are widely known. Additionally, Patent Documents 1 and 2 describe polyacetal powders that can be used as powdery materials for selective laser sintering 3D printers.

Patent Document 1: JP 2020-002247 A

Patent Document 2: JP 2013-508199 A

SUMMARY OF INVENTION

However, three-dimensional shaped objects fabricated by selective laser sintering using conventional polyacetal powders for 3D printers have the problem that they have a lot of warping and voids, thus having a poor appearance. Additionally, they have a low filling rate, making it difficult to obtain high-density and high-strength three-dimensional shaped objects.

An objective of the present invention is to provide a powdery material for a 3D printer from which a high-density and high-strength three-dimensional shaped object having an excellent appearance can be fabricated, a three-dimensional shaped object obtained by using the same, and a production method therefor.

As a result of having performed diligent investigation, the present inventors discovered that all of the above-mentioned problems can be solved by a powdery material comprising a polyacetal copolymer resin powder that includes a certain amount of a comonomer and that has a melt flow rate within a certain range, thus completing the present invention.

In other words, the present invention includes the embodiments below.

[1] A powdery material (X) for a 3D printer, the powdery material (X) comprising a polyacetal copolymer resin powder (I), wherein: a percentage occupied by comonomer units among all constituent units (100 mass %) in the polyacetal copolymer resin is at least 1.0 mass % and at most 6.0 mass %; and an average particle diameter of the powder (I) is at least 30 μm and at most 70 μm, and a melt flow rate of the powder (I) measured at a temperature of 190° C. and with a load of 2.16 kg is at least 1.0 g/10 min and at most 8.0 g/10 min.

[2] The powdery material (X) according to [1], wherein a difference (Tm2−Tc) between a melting point Tm2 and a crystallization temperature Tc of the powder (I), measured with a differential scanning calorimeter, is at least 15° C. and at most 40° C.

[3] The powdery material (X) according to [1] or [2], wherein a crystal melting enthalpy ΔHm of the powder (I), measured with a differential scanning calorimeter, is at least 100 J/g and at most 140 J/g.

[4] The powdery material (X) according to any one of [1] to [3], wherein a ratio (D90/D10) between a particle diameter D90 at which the volume-based cumulative frequency becomes 90% and a particle diameter D10 at which the volume-based cumulative frequency becomes 10% in the powder (I) is at most 10.

[5] The powdery material (X) according to any one of [1] to [4], wherein the comonomer units are oxyalkylene units having two or more carbon atoms.

[6] The powdery material (X) according to any one of [1] to [5], wherein the comonomer units are at least one type of oxyalkylene units selected from among oxyethylene groups, oxypropylene groups, and oxytetramethylene groups.

[7] A three-dimensional shaped object production method that comprises supplying the powdery material (X) according to any one of [1] to [6] to a selective laser sintering 3D printer.

[8] A three-dimensional shaped object comprising a sintered body composed of the powdery material (X) according to any one of [1] to [6].

According to the present invention, it is possible to provide a powdery material for a 3D printer from which a high-density and high-strength three-dimensional shaped object having an excellent appearance can be fabricated, a three-dimensional shaped object obtained by using the same, and a production method therefor.

DESCRIPTION OF EMBODIMENTS

Hereinafter, an embodiment of the present invention will be explained in detail. The present invention is not limited to the embodiment below, and can be implemented by introducing changes, as appropriate, within a range not compromising the effects of the present invention. In the present specification, the symbol "-" means "at least . . . and at most . . . ". Additionally, the "average particle diameter" means the particle diameter D50 at which the cumulative frequency becomes 50% in a volume-based arithmetic mean particle diameter measured by laser diffraction/scattering-type particle size distribution measurement. The average particle diameter can, for example, be measured by using a laser diffraction/scattering-type particle size distribution measuring apparatus (e.g., product name: LA-960, manufactured by Horiba, Ltd.).

[Powdery Material (X) for 3D Printer] The powdery material (X) for a 3D printer (hereinafter referred to as "powdery material (X)") according to the present embodiment comprises a polyacetal copolymer resin powder (I), wherein the percentage occupied by comonomer units among all constituent units (100 mass %) in the polyacetal copolymer resin is at least 1.0 mass % and at most 6.0 mass %, the average particle diameter of the powder (I) is at least 30 μm and at most 70 μm, and the melt flow rate of the powder (I) measured at a temperature of 190° C. and with a load of 2.16 kg is at least 1.0 g/10 min and at most 8.0 g/10 min. The powdery material (X) can be used to fabricate a high-density and high-strength three-dimensional shaped object having an excellent appearance.

<Polyacetal Copolymer Resin Powder (I)>

The powdery material (X) comprises a polyacetal copolymer resin powder (I) (hereinafter described as the "powder (I)"). The powder (I) is composed of a polyacetal copolymer resin. In the polyacetal copolymer resin according to the present embodiment, the percentage occupied by comonomer units among all constituent units (100 mass %) in the polyacetal copolymer resin is at least 1.0 mass % and at most 6.0 mass %. Additionally, the powder (I) is characterized by having an average particle diameter of at least 30 μm and at most 70 μm, and in that the melt flow rate of the powder (I) measured at a temperature of 190° C. and with a load of 2.16 kg is at least 1.0 g/10 min and at most 8.0 g/10 min.

(Comonomer Units)

The polyacetal copolymer resin according to the present embodiment is a copolymer resin comprising oxymethylene units (—$CH_2O$—) as the main constituent units and further comprising comonomer units other than the oxymethylene units. In the present specification, "main constituent units" refers to monomer units such that the percentage occupied by the monomer units among all constituent units (100 mass %) constituting the polyacetal copolymer resin is at least 50 mass % and preferably at least 70 mass %.

The percentage of comonomer units in the polyacetal copolymer resin with respect to all constituent units (100 mass %) in the polyacetal copolymer resin is at least 1.0 mass % and at most 6.0 mass %, preferably at least 1.5 mass % and at most 5.5 mass %, more preferably at least 2.0 mass % and at most 5.0 mass %, and particularly preferably at least 2.5 mass % and at most 4.5 mass %. Due to the powdery material (X) having an average particle diameter of 30-70 μm and the comonomer units comprising the powder (I) in the aforementioned range, a three-dimensional shaped object having an excellent appearance, with little warping and few voids, can be fabricated. The percentage of comonomer units in the polyacetal copolymer resin can be calculated by 1H-NMR. For example, a sample can be prepared by dissolving the powder (I) in deuterated hexafluoroisopropanol so that the concentration becomes 5 mass %. This sample can be analyzed by 1H-NMR and the percentage can be calculated by a method of determining the percentage of the integrated value corresponding to the comonomer units (for example, the oxyalkylene units having two or more carbon atoms to be described below) relative to the integrated value corresponding to all monomer peaks in the polyacetal copolymer resin.

The comonomer units contained in the polyacetal copolymer resin may be of one type or may be of two or more types.

The comonomer units are preferably oxyalkylene units having two or more carbon atoms. Due to the comonomer units being oxyalkylene units having two or more carbon atoms, good thermal stability tends to be obtained. Additionally, the comonomer units are more preferably at least one type of oxyalkylene units selected from among oxyethylene groups, oxypropylene groups, and oxytetramethylene groups, among which oxyethylene groups are particularly preferred. When oxyethylene units are included as the comonomer units, the percentage of all comonomer units (100 mass %) occupied by the oxyethylene units is preferably at least 90 mass % and at most 100 mass %, and more preferably at least 95 mass % and at most 100 mass %.

Additionally, the polyacetal copolymer resin may be any one of a random copolymer, a block copolymer, or a graft copolymer. From the viewpoint of thermal stability, a random copolymer is preferable.

Furthermore, the degree of polymerization, the degree of branching, and the degree of crosslinking of the polyacetal copolymer resin can be adjusted, as appropriate, within a range satisfying the abovementioned melt flow rate (MFR).

(Average Particle Diameter)

The average particle diameter of the powder (I) is at least 30 μm and at most 70 μm, preferably at least 35 μm and at most 65 μm, and more preferably at least 40 μm and at most 60 μm. By setting the average particle diameter to be at least 30 μm and at most 70 μm, uniform thin layers can be formed when shaping an object with a selective laser sintering 3D printer. Additionally, the contact strength between layers can be increased to obtain a three-dimensional shaped object having excellent strength and heat resistance. The method for measuring the "average particle diameter" is as described above.

The ratio (D90/D10) between the particle diameter D90 at which the volume-based cumulative frequency becomes 90% and the particle diameter D10 at which the volume-based cumulative frequency becomes 10% in the powder (I) is preferably at most 10, more preferably at least 1 and at most 8, and is even more preferably at least 2 and at most 6. As long as (D90/D10) is at most 10, warping of shaped objects can be easily suppressed.

According to one aspect, the particle diameter D90 of the powder (I) may be at least 80 μm and at most 110 μm, and may further be at least 85 μm and at most 105 μm. Additionally, the particle diameter D10 of the powder (I) may be at least 5 μm and at most 35 μm, and may further be at least 10 μm and at most 30 μm. The particle diameter D90 and the particle diameter D10 can be calculated by the same method as that for the average particle diameter described above.

(Melt Flow Rate (MFR))

The MFR of the powder (I) measured at a temperature of 190° C. and with a load of 2.16 kg is at least 1.0 g/10 min and at most 8.0 g/10 min, preferably at least 1.2 g/10 min and at most 7.0 g/10 min, and more preferably at least 1.4 g/10 min and at most 6.0 g/10 min. Due to the MFR being within the aforementioned ranges, shaped objects can be provided with good strength. The MFR of the powder (I) can be measured under conditions with a temperature of 190° C. and a load of 2.16 kg based on ISO 1133 (condition D).

When fabricating a three-dimensional shaped object by selective laser sintering, there is a need to repeat a process of layering a powdery material and then sintering the powdery material by irradiation with a laser. In order to obtain a high-density and high-strength three-dimensional shaped object, it is important to increase the filling rate of the powdery material. However, as described above, conventional polyacetal powders have a low filling rate. Therefore, gaps (voids) are created inside and on the surfaces of shaped objects, thereby degrading the appearance and the strength thereof. The present inventors, upon performing evaluations focusing on the phenomena of melting and sintering of the powdery materials in selective laser sintering, discovered that high-density and high-strength shaped objects in which voids tend not to be created and which have a high filling rate can be obtained by using a powdery material satisfying the conditions that (1) the powder can be easily and sufficiently melted by laser irradiation, and (2) the powder is not solidified (sintered) immediately after melting. As a result of further diligent investigation, the present inventors discovered that the phenomena in (1) and (2) above can be achieved by including a polyacetal copolymer resin powder (I) having a certain average particle diameter, by having a large amount of a comonomer in the polyacetal copolymer resin, and by setting the MFR of the powder (I) to be relatively low.

(Melting Point Tm2 and Crystallization Temperature Tc)

In the powder (I) according to the present embodiment, the difference (Tm2−Tc) between the melting point Tm2 and the crystallization temperature Tc measured by a differential scanning calorimeter is preferably at least 15° C. and at most 40° C. If (Tm2−Tc) for the powder (I) is at least 15° C. and at most 40° C., the crystallization is delayed, thereby providing a better balance between the melting and sintering of the powdery material (X), and tending to yield three-dimensional shaped objects with little warping and voids. Additionally, three-dimensional shaped objects with a high filling rate and high strength tend to be obtained. The (Tm2−Tc) for the powder (I) is more preferably at least 20° C. and at most 35° C., and even more preferably at least 25° C. and at most 30° C.

The melting point Tm2 refers to a temperature determined by a method, based on JIS K-7121 (1999), that involves heating the powder (I) from 40° C. to 200° C. at a temperature increase rate of 10° C./min (1st run), followed by holding the temperature at 200° C. for five minutes, then cooling to 40° C. at a temperature decrease rate of 10° C./min, followed by holding the temperature at 40° C. for five minutes, then heating again from 40° C. to 200° C. at a temperature increase rate of 10° C./min (2nd run), wherein the melting point Tm2 is the temperature of the peak top of an endothermic peak observed during the 2nd run. Similarly, the crystallization temperature Tc refers to a temperature determined by a method, based on JIS K-7121 (1999), that involves heating the powder (I) from 40° C. to 200° C. at a temperature increase rate of 10° C./min (1st run), followed by holding the temperature at 200° C. for five minutes, then cooling to 40° C. at a temperature decrease rate of 10° C./min, wherein the crystallization temperature Tc is the temperature of the peak top of an exothermic peak observed during the cooling step.

According to one aspect, the melting point Tm2 of the powder (I) may be at least 160° C. and at most 175° C., and may be at least 162° C. and at most 173° C. Additionally, since the powder (I) according to the present embodiment has an MFR of 1.0-8.0 g/min, the crystallization temperature Tc tends to become lower. According to one aspect, the crystallization temperature Tc may be at least 130° C. and at most 155° C., and may be at least 135° C. and at most 150° C.

(Crystal Melting Enthalpy ΔHm)

The powder (I) according to the present embodiment has a crystal melting enthalpy ΔHm, measured with a differential scanning calorimeter, is preferably at least 100 J/g and at most 140 J/g. Since the powder (I) according to the present embodiment has a high comonomer amount, the ΔHm is a relatively low value. If ΔHm is at least 100 J/g and at most 140 J/g, the powder (I) can more easily melt and the fusion between particles tends to be good. As a result thereof, a high-strength three-dimensional shaped object tends to be obtained. ΔHm is more preferably at least 105 J/g and at most 135 J/g, and even more preferably at least 110 J/g and at most 130 J/g. The crystal melting enthalpy ΔHm refers to a value determined by a method, based on JIS K-7121 (1999), that involves heating the powder (I) from 40° C. to 200° C. at a temperature increase rate of 10° C./min (1st run), followed by holding the temperature at 200° C. for five minutes, then cooling to 40° C. at a temperature decrease rate of 10° C./min, followed by holding the temperature at 40° C. for five minutes, then heating again from 40° C. to 200° C. at a temperature increase rate of 10° C./min (2nd run), wherein the crystal melting enthalpy ΔHm is the value of the area of the endothermic peak observed during the 2nd run.

The mass-average molecular weight (Mw) of the polyacetal copolymer resin according to the present embodiment is not particularly limited as long as it has the effects of the present invention, and can be adjusted, as appropriate, within a range such that MFR becomes 1.0-8.0 g/10 min. According to one aspect, the Mw of the polyacetal copolymer resin may be at least 10,000 and at most 400,000. As long as the Mw is within the aforementioned range, shaped objects tend to have good strength. The Mw can be measured (in terms of polystyrene) by size exclusion chromatography (SEC).

<Method for Producing Polyacetal Copolymer Resin Powder (I)>

The powder (I) can be produced by obtaining a polyacetal copolymer resin by a known polymerization method, then further pulverizing the copolymer resin by a known method. Hereinafter, one embodiment of the method for producing the powder (I) will be explained.

(Method for Producing Polyacetal Copolymer Resin)

The polyacetal copolymer resin can be produced by polymerizing a monomer mixture comprising a cyclic trimer or tetramer of formaldehyde, which is the main monomer, and a comonomer, in the presence of a polymerization catalyst and a chain transfer agent. In the present specification, "main monomer" refers to a monomer comprising at least 50 mass % relative to all monomers (100 mass %) constituting the polyacetal copolymer resin. In the present specification, "comonomer" refers to a monomer that can be copolymerized with the main monomer and that can constitute the aforementioned comonomer units.

The main monomer preferably comprises trioxane. Trioxane is generally obtained by reacting an aqueous formaldehyde solution in the presence of an acidic catalyst, and a form prepared by subjecting the above to a method such as distillation may be used. As the trioxane, a type with a low amount of impurities such as water and methanol is preferably used.

The comonomer may, for example, be an alkylene oxide having two or more carbon atoms, a cyclic acetal compound, etc.

The alkylene oxide having two or more carbon atoms may, for example, be ethylene oxide, propylene oxide, 1,2-butylene oxide, 2,3-butylene oxide, etc. These alkylene oxides may be used as a single type alone, or may be used as a combination of two or more types.

The cyclic acetal compound may, for example, be 1,3-dioxolane, propylene glycol formal, diethylene glycol formal, triethylene glycol formal, 1,4-butanediol formal, 1,5-pentanediol formal, 1,6-hexanediol formal, etc. These cyclic acetal compounds may be used as a single type alone, or may be used as a combination of two or more types.

Among the above, the comonomer preferably comprises a cyclic acetal compound, and more preferably comprises 1,3-dioxolane.

The percentage of the comonomer in the polyacetal copolymer resin can be adjusted, as appropriate, within a range such that the percentage of comonomer units in the polyacetal copolymer resin becomes 1.0-6.0 mass %. According to one aspect, the percentage of the comonomer in the polyacetal copolymer resin, relative to all monomers (100 mass %), may be at least 1.0 mass % and at most 6.0 mass %, at least 1.5 mass % and at most 5.5 mass %, at least 2.0 mass % and at most 5.0 mass %, or at least 2.5 mass % and at most 4.5 mass %.

In the present embodiment, the polyacetal copolymer resin can be produced by a method such as adding a suitable amount of a molecular weight regulator, as needed, to a monomer mixture comprising trioxane and the comonomer, and using a cationic polymerization catalyst to perform bulk polymerization.

The polymerization apparatus is not particularly limited, and a known apparatus may be used. Additionally, either a batch-type method or a continuous method may be employed. The polymerization temperature should preferably be held at 65-135° C. The polymerization catalyst may be deactivated after polymerization by adding a basic compound or an aqueous solution thereof, etc. to a reaction product collected from the polymerization apparatus, or to a reaction product inside the polymerization apparatus.

The cationic polymerization catalysts that may be used in the present embodiment include lead tetrachloride; tin tetrachloride; titanium tetrachloride; aluminum trichloride; zinc chloride; vanadium trichloride; antimony trichloride; phosphorus pentafluoride; antimony pentafluoride; boron trifluoride coordination compounds such as boron trifluoride, boron trifluoride diethyl etherate, boron trifluoride dibutyl etherate, boron trifluoride dioxanate, boron trifluoride acetic anhydrate, and boron trifluoride triethylamine complexes; inorganic acids and organic acids such as perchloric acid, acetyl perchlorate, t-butyl perchlorate, hydroxyacetic acid, trichloroacetic acid, trifluoroacetic acid, and p-toluenesulfonic acid; complex salt compounds such as triethyloxonium tetrafluoroborate, triphenylmethylhexafluoroantimonate, allyldiazonium hexafluorophosphate, and allyldiazonium tetrafluoroborate; alkyl metal salts such as diethyl zinc, triethyl aluminum, and diethyl aluminum chloride; heteropolyacids; isopolyacids; etc. Among the above, boron trifluoride coordination compounds such as boron trifluoride, boron trifluoride diethyl etherate, boron trifluoride dibutyl etherate, boron trifluoride dioxanate, boron trifluoride acetic anhydrate, and boron trifluoride triethylamine complexes are preferable. These catalysts can also be used by being diluted with an organic solvent, etc. in advance.

The molecular weight regulator used in the present embodiment may be a linear formal compound. Linear formal compounds include, for example, methylal, ethylal, dibutoxymethane, bis(methoxymethyl) ether, bis(ethoxymethyl) ether, and bis(butoxymethyl) ether. Among the above, at least one type selected from the group consisting of methylal, ethylal, and dibutoxymethane is preferable.

Additionally, as a basic compound for neutralizing and deactivating the polymerization catalyst, it is possible to use ammonia; amines such as triethylamine, tributylamine, triethanolamine, and tributanolamine; alkali metal and alkaline earth metal hydroxide salts; or other known catalyst deactivators. Additionally, after the polymerization reaction has ended, the reaction product is preferably deactivated by quickly adding an aqueous solution of the above thereto. The polymerization method and the deactivation method may further be followed, as needed, by washing, separation and recovery of unreacted monomers, drying, etc., using conventionally known methods to obtain the polyacetal copolymer resin.

Various types of stabilizers may be blended, as needed, to perform a stabilization treatment such as decomposition and removal or sealing of unstable terminal portions of the polyacetal copolymer resin. As the stabilizers, conventionally known antioxidants, heat stabilizers, etc. may be used. For example, hindered phenol compounds, nitrogen-containing compounds, alkali or alkaline earth metal hydroxides, inorganic salts, carboxylates, etc. may be used as one type alone or as a combination of two or more types.

Furthermore, general additives for the polyacetal copolymer resin, for example, colorants such as dyes and pigments, lubricants, crystal nucleating agents, mold release agents, antistatic agents, surfactants, or organic polymer materials, etc. may be added, as needed, as a single type or as two or more types, within a range not compromising the effects of the polyacetal copolymer resin of the present embodiment.

The polyacetal copolymer resin obtained by the production method described above, molded into pellets, fibers, films, etc., may be pulverized by dry pulverization, wet pulverization, or freeze pulverization using a jet mill, a bead mill, a hammer mill, a ball mill, a cutter mill, a pin mill, a stone mill type grinder, etc. to obtain the powder (I) having an average particle diameter of at least 30 μm and at most 70 μm. Additionally, a method of dissolving the polyacetal copolymer resin in a solvent and then spray-drying, a poor-solvent precipitation method of forming an emulsion in a solvent and then bringing the emulsion into contact with a poor solvent, a liquid drying method of forming an emulsion in a solvent and then drying to remove the organic solvent, etc. may also be used. Additionally, when blending another thermoplastic resin (organic polymer material) into the polyacetal copolymer resin, a method of mixing the polyacetal copolymer resin with the another thermoplastic resin, then dissolving and removing the another thermoplastic resin with a solvent may be employed to obtain a powder (I) having the average particle diameter described above. Additionally, a method of pulverizing oligomers of the polyacetal copolymer resin, then subjecting the oligomers to solid phase polymerization may be employed to obtain a powder (I) having the average particle diameter described above.

The shape of the powder (I) is not particularly limited as long as the effects of the present invention are obtained, and may be any form, such as spherical (including substantially spherical), spindle-shaped, irregular particle-shaped, fibrillated, and fibrous. Additionally, from the viewpoint of filling performance and powder flowability, the powder should preferably be spherical (including substantially spherical) or irregular particle-shaped.

The percentage of the powder (I) in the powdery material (X) relative to the total mass of the powdery material (X) is preferably at least 50 mass %, and more preferably at least 70 mass %. Additionally, though the upper limit thereof is not particularly limited, it may be 100 mass %, or may be at most 95 mass %. That is, the percentage of the powder (I) in the powdery material (X) relative to the total mass of the powdery material (X) may be 50-100 mass %, or may be 50-95 mass %. Additionally, it may be 70-100 mass %, or may be 70-95 mass %.

The powder (I) may be used as a single type alone, or may be used as a combination of two or more types. When two or more types of powders (I) are to be combined, the blending ratio thereof may be adjusted so that the mixture of the powders (I) satisfies the comonomer amount, the average particle diameter and the MFR value mentioned above.

The powdery material (X) may contain a filler other than the powder (I).

The filler other than the powder (I) (hereinafter referred to as "other filler") may include, for example, various fibrous, powdery, and flake-shaped inorganic and organic fillers, powders of thermoplastic resins other than the polyacetal resin (other thermoplastic resins), etc.

(Other Fillers)

Inorganic fillers may include, for example, powdery fillers and flake-shaped fillers having an average particle diameter of at most 500 nm, preferably at most 400 nm, fibrous fillers having an average fiber length of at most 100 μm, etc. By including such inorganic fillers, the powder flowability and dispersibility of the powder (I) tends to increase. Additionally, the strength of the obtained three-dimensional shaped object tends to further increase. According to one embodiment, from the viewpoint of tending to make the powder flowability further increase, a powdery filler is preferably included. The average particle diameter of the inorganic filler can be measured by the same method as that for the powder (I). Additionally, the average fiber length can be determined, for example, by measuring the fiber lengths of the fibrous filler with an image measurer (for example, product name: LUZEXFS, manufactured by Nicolet Instrument Corp.), then calculating the average value thereof.

Powdery fillers include, for example, carbon black; graphite; silica; quartz powder; glass beads; glass balloons; glass powder; silicates such as calcium silicate, aluminum silicate, kaolin, clay, diatomaceous earth, and wollastonite; metal oxides such as iron oxide, titanium oxide, zinc oxide, antimony trioxide, and alumina; metal carbonates such as calcium carbonate and magnesium carbonate; metal sulfates such as calcium sulfate and barium sulfate; as well as ferrites, silicon carbide, silicon nitride, boron nitride, various types of metal powders, etc. These powdery fillers may be used as a single type alone or may be used as a combination of two or more types. Among the above, from the viewpoint of powder flowability, the powdery filler should preferably be carbon black or silica. Additionally, the powdery filler may be surface-treated with a surface treatment agent. Surface treatment agents include silanol, dimethyldichlorosilane (dimethylsilyl), hexamethyldisilazane (trimethylsilyl), octylsilane (octylsilyl), silicone oil (dimethylpolysiloxane), etc.

Fibrous fillers include, for example, inorganic fibrous substances such as glass fibers, milled glass fibers, carbon fibers, carbon nanotubes, asbestos fibers, silica fibers, silica/alumina fibers, alumina fibers, zirconia fibers, boron nitride fibers, silicon nitride fibers, boron fibers, potassium titanate fibers, fibers of silicates such as wollastonite, magnesium sulfate fibers, aluminum borate fibers, and further thereto, fibrous materials composed of metals such as stainless steel, aluminum, titanium, copper, and brass. A high-melting-point organic fibrous substance such as a polyamide, a fluororesin, a polyester resin, an acrylic resin, etc. may also be used. These fibrous fillers may be used as a single type alone, or as a combination of two or more types. From the viewpoint of powder flowability, the fibrous filler should preferably be carbon nanotubes. Additionally, the fibrous filler may be surface-treated with a surface treatment agent. Surface treatment agents include silanol, dimethyldichlorosilane (dimethylsilyl), hexamethyldisilazane (trimethylsilyl), octylsilane (octylsilyl), silicone oil (dimethylpolysiloxane), etc.

Flake-shaped fillers include mica, glass flakes, talc, various types of metal foils, etc. These flake-shaped fillers may be used as a single type alone or as a combination of two or more types.

When the powdery material (X) includes another filler, the content thereof may be 0-100 parts by mass relative to 100 parts by mass of the powder (I).

(Other Thermoplastic Resins)

The powdery material (X) may contain another thermoplastic resin powder other than the powder (I). Oher thermoplastic resins include, for example, polyethylene resins, polypropylene resins, polyethylene terephthalate resins, polybutylene terephthalate resins, polyamide resins, etc. These may be used as a single type alone or as a combination of two or more types.

The other thermoplastic resin is preferably blended into the powdery material (X) in the form of a powder having an average particle diameter of 10-70 μm. When the powdery material (X) contains another thermoplastic resin powder, the blended amount thereof may be set to be 0-50 parts by mass relative to 100 parts by mass of the powder (I).

[Production Method for Powdery Material (X) for 3D Printer]

The powdery material (X) can be produced by mixing the powder (I) with other additives, as needed, by a conventionally known method. For example, a mixing method based on shaking, a mixing method also involving pulverization with a ball mill, etc., or a mixing method based on stirring vanes, such as a Henschel mixer, etc. may be used.

[Three-Dimensional Shaped Object]

The three-dimensional shaped object according to the present embodiment is formed by using the powdery material (X) comprising the above-mentioned powder (I). That is, the three-dimensional shaped object according to the present embodiment includes a sintered body composed of the powdery material (X). Such a three-dimensional shaped object has a good appearance and has high density and high strength. According to one aspect, the flexural strength of the three-dimensional object, measured in accordance with ISO 178, should preferably be at least 65 MPa.

[Method for Producing Three-Dimensional Shaped Object]

The method for producing the three-dimensional shaped object according to the present embodiment comprises a step for supplying the powdery material (X) comprising the powder (I) to a selective laser sintering 3D printer. Then, the supplied powdery material (X) is used to shape the three-dimensional shaped object (shaping step).

[Shaping Step]

In the shaping step by the selective laser sintering 3D printer, the supplied powdery material (X) is used to form a thin layer and the thin layer is irradiated with a laser beam in a shape corresponding to the cross-sectional shape of the object to be shaped, thereby sintering the powdery material (X). This step is successively repeated, thereby stacking sintered thin layers to produce the three-dimensional shaped object. The conditions in which the thin layers are formed with the powdery material (X), the conditions of the laser beam, etc. are not particularly limited, and can be adjusted, as appropriate, in accordance with the settings of the selective laser sintering 3D printer that is used. The powdery material (X) according to the present embodiment comprises the characteristic powder (I) described above, and therefore has the characteristics of being easily melted by irradiation with the laser beam and the powder not immediately being sintered after melting (i.e., having a good balance of melting and sintering). Therefore, a high-density and high-strength three-dimensional shaped object with few gaps and voids, and with an excellent appearance can be obtained.

As the selective laser sintering 3D printer, one that is conventionally known can be used. For example, product name "RaFaEl® II 300-HT", manufactured by Aspect Inc., etc. may be used.

Another embodiment of the present invention is use of or a method of using the powdery material (X) comprising the powder (I) described above as a resin raw material for a three-dimensional shaped object produced by using a 3D printer.

EXAMPLES

Hereinafter, the present invention will be explained in detail by indicating examples. However, the present invention is not limited by the descriptions below.

Example 1

Polymerization was performed using a continuous mixing reactor equipped with a jacket for passing a heat medium (or coolant) on the outside thereof and composed of paddle-equipped rotating shafts having a cross section in the shape of two partially overlapping circles. Specifically, trioxane and a comonomer (1,3-dioxolane) were added to the reactor in the ratios indicated in Table 1 while rotating each of two paddle-equipped rotating shafts at 150 rpm. Furthermore, methylal was added as a molecular weight regulator in the ratio indicated in Table 1. Next, bulk polymerization was performed by continuously adding and supplying a catalyst mixture obtained by mixing boron trifluoride gas, which is a catalyst, into trioxane so as to be in the amount 0.005 mass % in terms of boron trifluoride. After the polymerization ended, the catalyst was deactivated by quickly adding the reaction product discharged from the reactor, while passing the reaction product through a pulverizer, to an aqueous solution containing 0.1 mass % triethylamine at 80° C. After further separation, washing, and drying, a crude polyacetal copolymer was obtained.

Next, 4 parts by mass of a 5 mass % triethylamine aqueous solution and 0.03 parts by mass of pentaerythrityl-tetrakis [3-(3,5-di-tert-butyl-4-hydroxyphenyl) propionate] (an antioxidant) were added to 100 parts by mass of the crude polyacetal copolymer, and the mixture was melt-kneaded at 210° C. using a twin-screw extruder to remove unstable portions in the crude polyacetal copolymer. Furthermore, 0.3 parts by mass of pentaerythrityl-tetrakis [3-(3,5-di-tert-butyl-4-hydroxyphenyl) propionate], as a stabilizer, and 0.15 parts by mass of melamine were added to 100 parts by mass of the polyacetal copolymer obtained by the method described above, and the mixture was melt-kneaded at 210° C. using a twin-screw extruder to obtain a pellet-shaped polyacetal copolymer resin. The amount of the comonomer relative to all monomers (100 mass %) in this polyacetal copolymer resin was 5.9 mass %. Additionally, the percentage of comonomer units (in terms of oxyethylene units) relative to all constituent units (100 mass %) in the polyacetal copolymer resin, as calculated by 1H-NMR, was 3.5 mass %. Next, the obtained polyacetal copolymer resin was pulverized using a jet mill to obtain a polyacetal copolymer resin powder (I). The average particle diameter, the particle diameter D90, the particle diameter D10, D90/D10, the MFR, the melting point Tm2, the crystallization temperature Tc, and the crystal melting enthalpy ΔHm of the obtained powder (I) were measured by the methods described below. The results are shown in Table 1.

A powdery material (X) containing the obtained powder (I) in an amount as shown in Table 1 was prepared. Then, the powdery material (X) was supplied to a selective laser sintering 3D printer (product name: RaFaEl II 300-HT; manufactured by Aspect Inc.; laser type: $CO_2$ laser (10.6 μm); output power: 12 W), and a bending test piece having dimensions of 80 mm×10 mm×4 mm was prepared as a three-dimensional shaped object. The appearance, the percentage of the density relative to true specific gravity, and the flexural strength of the obtained three-dimensional shaped object were evaluated under the conditions indicated below. The results are shown in Table 1.

<Comonomer Units>

A sample was prepared by dissolving the obtained powder (I) in deuterated hexafluoroisopropanol so as to be at a concentration of 5 mass %. This sample was analyzed by 1H-NMR (product name: Avance III 400, manufactured by Bruker Corp.; magnetic field strength: 400 MHz; reference material: tetramethylsilane; temperature: 27° C.; number of scans: 128 times) to determine the percentage of the integrated value corresponding to the comonomer units (oxyethylene groups) relative to the integrated value corresponding to all monomer peaks in the polyacetal copolymer resin.

<Average Particle Diameter, Particle Diameter D90, and Particle Diameter D10>

A laser diffraction/scattering-type particle size distribution measuring apparatus (e.g., product name: LA-960, manufactured by Horiba, Ltd.) was used, with acetone as the dispersion solvent, to measure the average particle diameter (D50), the particle diameter D90, and the particle diameter D10. The respective particle diameters were calculated as volume-based arithmetic mean particle diameters.

<Melting Point Tm2, Crystallization Temperature Tc, and Crystal Melting Enthalpy ΔHm>

Using a differential scanning calorimeter (product name: DSC 8500, manufactured by PerkinElmer Inc.), heating was performed from 40° C. to 200° C. at a temperature increase rate of 10° C./min (1st run), followed by holding the temperature at 200° C. for five minutes, then cooling to 40° C. at a temperature decrease rate of 10° C./min. The peak top temperature of an exothermic peak observed at that time was measured as the crystallization temperature Tc. Additionally, the value of the area of an endothermic peak was measured as the crystal melting enthalpy ΔHm. Then, the temperature was held at 40° C. for five minutes, followed by heating again from 40° C. to 200° C. at a temperature increase rate of 10° C./min. The temperature of the peak top of an endothermic peak in a 2nd run observed at that time was measured as the melting point Tm2.

<Appearance of Three-Dimensional Shaped Object>

Warping and voids in the obtained three-dimensional shaped objects were evaluated in accordance with the evaluation criteria indicated below, and a grade of "B" or higher was considered to be passing. The appearance of the three-dimensional shaped objects was evaluated by visual inspection.

(Evaluation Criteria)

A: A shaped object lacking warping or voids was obtained.

B: A shaped object with little warping and few voids was obtained.

C: A shaped object was obtained, but with a lot warping and voids.

D: A shaped object was not able to be obtained.

<Percentage of Density Relative to True Specific Gravity of Three-Dimensional Shaped Objects>

An electronic densimeter (product name: SD-200L, manufactured by Alfa Mirage Co., Ltd.) was used to measure the densities of the three-dimensional shaped objects obtained in Example 1 in accordance with JIS K7112, and the percentages of the densities relative to the true specific gravity (1.41 g/cm$^3$) of the polyacetal copolymer resin was calculated. Additionally, evaluations were made in accordance with the evaluation criteria indicated below, and a grade of "B" or higher was considered to be passing.

(Evaluation Criteria)

A: The density was at least 90% relative to the true specific gravity.

B: The density was at least 80% and lower than 90% relative to the true specific gravity.

C: The density was at least 70% and lower than 80% relative to the true specific gravity.

D: The density was lower than 70% relative to the true specific gravity.

<Flexural Strength>

The flexural strengths of the three-dimensional shaped objects obtained in Example 1 were measured in accordance with ISO 178. Additionally, evaluations were made in accordance with the evaluation criteria indicated below, and a grade of "B" or higher was considered to be passing.

(Evaluation Criteria)

A: The flexural strength was at least 70 MPa.

B: The flexural strength was at least 65 MPa and lower than 70 MPa.

C: The flexural strength was at least 60 MPa and lower than 65 MPa.

D: The flexural strength was lower than 60 MPa.

Examples 2 and 3, and Comparative Examples 1 and 2

Powders (I) were prepared by the same method as that in Example 1, except that the amounts of trioxane, comonomer (1,3-dioxolane), and methylal that were added were set to the values in Table 1. Additionally, the average particle diameter, the particle diameter D90, the particle diameter D10, D90/D10, the MFR, the melting point Tm2, the crystallization temperature Tc, and the crystal melting enthalpy ΔHm of the powders (I) were measured by the same method as that in Example 1. Furthermore, powdery materials (X) comprising the obtained powders (I) in the amounts indicated in Table 1 were prepared, and three-dimensional shaped objects were fabricated by the same method as that in Example 1. Thereafter, the appearance, the percentage of density relative to true specific gravity, and the flexural strength of the obtained three-dimensional shaped objects were evaluated under the same conditions as those in Example 1. The results are indicated in Table 1. In Table 1, the percentages of the comonomer units in Examples 2 and 3, and in Comparative Examples 1 and 2, as with Example 1, are values calculated in terms of the oxyethylene units. Additionally, the symbol "-" in the table means that a three-dimensional shaped object was not able to be obtained, and measurements therefore could not be made.

Comparative Example 3

A powder (I) was prepared by the same method as that in Example 1, except that the polyacetal copolymer resin was freeze pulverized using a pin mill. Additionally, the average particle diameter, the particle diameter D90, the particle diameter D10, D90/D10, the MFR, the melting point Tm2, the crystallization temperature Tc, and the crystal melting enthalpy ΔHm of the powder (I) were measured by the same method as that in Example 1. Furthermore, a powdery material (X) comprising the obtained powder (I) in the amount indicated in Table 1 was prepared, and a three-dimensional shaped object was fabricated by the same method as that in Example 1. Thereafter, the appearance, the percentage of density relative to true specific gravity, and the flexural strength of the obtained three-dimensional shaped object were evaluated under the same conditions as those in Example 1. The results are indicated in Table 1. In Table 1, the percentage of the comonomer units, as with Example 1, is a value calculated in terms of the oxyethylene units.

Example 4

A powdery material (X) was prepared by blending the inorganic filler indicated below, as in Table 1, to the powder (I) prepared in Example 1. Additionally, a three-dimensional shaped object was fabricated by the same method as that in Example 1. Thereafter, the appearance, the percentage of density relative to true specific gravity, and the flexural strength of the obtained three-dimensional shaped object were evaluated under the same conditions as those in Example 1. The results are indicated in Table 1. In Table 1, the percentage of the comonomer units, as with Example 1, is a value calculated in terms of the oxyethylene units.

(Inorganic Filler)

Powdery filler: Silica (fumed silica manufactured by Evonik Industries AG; product name: AEROSIL® R972; surface-treated with dimethyldichlorosilane; average particle diameter 16 nm).

TABLE 1

| | | | Ex. 1 | Ex. 2 | Ex. 3 | Ex. 4 | Comp. Ex. 1 | Comp. Ex. 2 | Comp. Ex. 3 |
|---|---|---|---|---|---|---|---|---|---|
| Polyacetal | Trioxane | (parts by mass) | 100 | 100 | 100 | 100 | 100 | 100 | 100 |
| Copolymer | 1,3-Dioxolane | (parts by mass) | 5.5 | 2.1 | 3.4 | 5.5 | 3.4 | 0.0 | 5.5 |
| Resin | Methylal | (parts by mass) | 0.1 | 0.2 | 0.4 | 0.1 | 0.6 | 0.6 | 0.1 |
| Powder (I) | Percentage of comonomer units | (mass %) | 3.5 | 1.2 | 2.1 | 3.5 | 2.1 | 0.0 | 3.5 |
| | MFR (190° C., 2.16 kgf) | (g/10 min) | 1.6 | 1.7 | 2.6 | 1.6 | 9.0 | 3.3 | 1.6 |
| | Average particle diameter | (μm) | 50 | 50 | 50 | 50 | 50 | 50 | 200 |
| | D90 particle diameter | | 94 | 90 | 92 | 94 | 96 | 93 | 295 |
| | D10 particle diameter | | 20 | 19 | 19 | 20 | 22 | 21 | 37 |
| | D90/D10 | (—) | 4.8 | 4.8 | 4.8 | 4.8 | 4.3 | 4.5 | 8.0 |
| | Melting point (Tm2) | (° C.) | 165 | 170 | 168 | 165 | 167 | 179 | 165 |
| | Crystallization temperature (Tc) | | 139 | 147 | 146 | 139 | 144 | 146 | 139 |
| | (Tm2 − Tc) | | 26 | 23 | 22 | 26 | 23 | 33 | 26 |
| | Crystal melting enthalpy (ΔHm) | (J/g) | 116 | 133 | 130 | 116 | 133 | 156 | 116 |
| Powdery | Percentage of powder (I) | (mass %) | 100 | 100 | 100 | 99.8 | 100 | 100 | 100 |
| Material (X) | Inorganic filler | (mass %) | — | — | — | 0.2 | — | — | — |
| Evaluation | Appearance of shaped object | (—) | A | B | B | A | C | D | C |
| Results | Percentage of density relative to true specific gravity of shaped object | (%) | 94 | 80 | 85 | 95 | 75 | — | 60 |

TABLE 1-continued

| | | Ex. 1 | Ex. 2 | Ex. 3 | Ex. 4 | Comp. Ex. 1 | Comp. Ex. 2 | Comp. Ex. 3 |
|---|---|---|---|---|---|---|---|---|
| Evaluation | (—) | A | B | B | A | C | D | C |
| Flexural strength | (MPa) | 78 | 65 | 66 | 80 | 65 | — | 50 |
| Evaluation | (—) | A | B | B | A | B | D | D |

As indicated in Table 1, the powdery materials in Examples 1~4 satisfying the features of the present embodiment were able to be used to fabricate three-dimensional shaped objects having a good appearance and having a high percentage of density relative to the true specific gravity. Additionally, the obtained three-dimensional shaped objects were also high in strength. Meanwhile, the powdery material of Comparative Example 1, which had an MFR (190° C., 2.16 kg load) of 9.0 g/10 min, had a lot of warping and voids in the shaped objects. Additionally, the percentage of the density relative to the true specific gravity was low, and the flexural strength was also low. The reason for this can be considered to be because crystallization occurred quickly after laser irradiation, so that solidification occurred without sufficient fusion between the particles. The powdery material of Comparative Example 2 obtained from a polyacetal polymer resin not comprising a comonomer was not able to be used to obtain a shaped object. The reason for this can be considered to be because the powdery material did not sufficiently melt, so that fusion did not occur between the particles. Furthermore, the powdery material of Comparative Example 3, having an average particle diameter of 200 μm, had a lot of warping and voids in the shaped object. Additionally, the percentage of the density relative to the true specific gravity was low, and the flexural strength was also low. This can be considered to be because the average particle diameter of the powdery material was large, and gaps were created between the particles.

From the results above, the powdery material (X) of the present embodiment was confirmed to be capable of fabricating high-density and high-strength three-dimensional shaped objects having an excellent appearance.

INDUSTRIAL APPLICABILITY

The powdery material for a 3D printer according to the present invention can be used to fabricate a high-density and high-strength three-dimensional shaped object having an excellent appearance. This powdery material is suitable for use as a resin raw material for a three-dimensional shaped object produced by using a 3D printer.

The invention claimed is:

1. A powdery material (X) for a 3D printer, the powdery material (X) consisting of a polyacetal copolymer resin powder (I) and optionally an inorganic filler, wherein the polyacetal copolymer resin powder (I) consists of a main monomer and a comonomer:

a percentage occupied by comonomer units among all constituent units (100 mass %) in the polyacetal copolymer resin is at least 1.0 mass % and at most 6.0 mass %; and an average particle diameter of the powder (I) is at least 30 μm and at most 70 μm, and a melt flow rate of the powder (I) measured at a temperature of 190° C. and with a load of 2.16 kg is at least 1.0 g/10 min and at most 8.0 g/10 min.

2. The powdery material (X) according to claim 1, wherein a difference (Tm2−Tc) between a melting point Tm2 and a crystallization temperature Tc of the powder (I), measured with a differential scanning calorimeter, is at least 15° C. and at most 40° C.

3. The powdery material (X) according to claim 1, wherein a crystal melting enthalpy ΔHm of the powder (I), measured with a differential scanning calorimeter, is at least 100 J/g and at most 140 J/g.

4. The powdery material (X) according to claim 1, wherein a ratio (D90/D10) between a particle diameter D90 at which the volume-based cumulative frequency becomes 90% and a particle diameter D10 at which the volume-based cumulative frequency becomes 10% in the powder (I) is at most 10.

5. The powdery material (X) according to claim 1, wherein the comonomer units are oxyalkylene units having two or more carbon atoms.

6. The powdery material (X) according to claim 1, wherein the comonomer units are at least one type of oxyalkylene units selected from among oxyethylene groups, oxypropylene groups, and oxytetramethylene groups.

7. A three-dimensional shaped object production method that comprises supplying the powdery material (X) according to claim 1 to a selective laser sintering 3D printer.

8. A three-dimensional shaped object comprising a sintered body composed of the powdery material (X) according to claim 1.

9. The powdery material (X) according to claim 2, wherein a crystal melting enthalpy ΔHm of the powder (I), measured with a differential scanning calorimeter, is at least 100 J/g and at most 140 J/g.

10. The powdery material (X) according to claim 2, wherein a ratio (D90/D10) between a particle diameter D90 at which the volume-based cumulative frequency becomes 90% and a particle diameter D10 at which the volume-based cumulative frequency becomes 10% in the powder (I) is at most 10.

11. The powdery material (X) according to claim 2, wherein the comonomer units are oxyalkylene units having two or more carbon atoms.

12. The powdery material (X) according to claim 2, wherein the comonomer units are at least one type of oxyalkylene units selected from among oxyethylene groups, oxypropylene groups, and oxytetramethylene groups.

13. A three-dimensional shaped object production method that comprises supplying the powdery material (X) according to claim 2 to a selective laser sintering 3D printer.

14. A three-dimensional shaped object comprising a sintered body composed of the powdery material (X) according to claim 2.

15. The powdery material (X) according to claim 1, wherein a percentage of the powder (I) in the powdery material (X) relative to the total mass of the powdery material (X) is at least 70 mass %.

* * * * *